Dec. 29, 1931.  A. WHITAKER ET AL  1,838,971

OPTICAL SLIT

Filed Jan. 26, 1929

Inventors.
Alfred Whitaker and
Cecil Oswald Browne.
By Cameron, Kerkam and Sutton.
Attorneys.

Patented Dec. 29, 1931

1,838,971

UNITED STATES PATENT OFFICE

ALFRED WHITAKER, OF WEST DRAYTON, AND CECIL OSWALD BROWNE, OF EALING, ENGLAND, ASSIGNORS, BY MESNE ASSIGNMENTS, TO RADIO CORPORATION OF AMERICA, OF NEW YORK, N. Y., A CORPORATION OF DELAWARE

OPTICAL SLIT

Application filed January 26, 1929, Serial No. 335,371, and in Great Britain February 20, 1928.

The present invention relates to optical slits, such, for example, as are used in making a photographic record of sound. It is frequently necessary to provide, for this and other purposes, an extremely fine slit and one which shall not become obstructed by particles of dust or by particles of film when the film is drawn across the surface of the body in which the slit is formed.

It has already been proposed to form an optical slit in the wedge shaped opening between two opaque members and to dispose a transparent wedge shaped member in the opening. In this arrangement however, the slit width is determined by the distance between the adjacent edges of the opaque members and is independent of the transparent member.

According to the present invention, an optical slit device comprises a prism of transparent material having a 'flat' formed on one edge, the width of the optical slit being determined by the width of said 'flat'.

Figure 2:
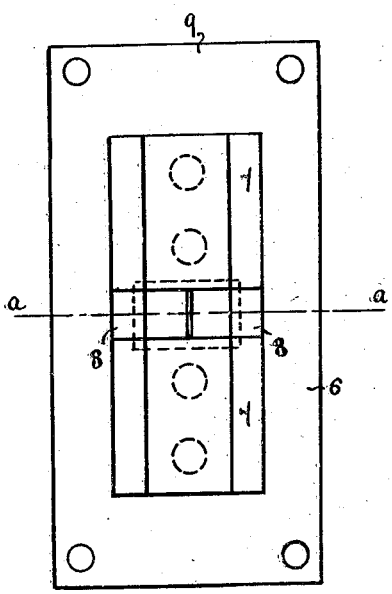
Figure 1:
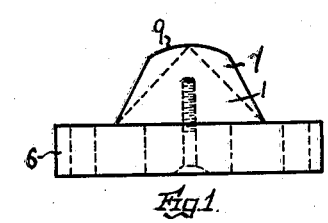
Figure 3:
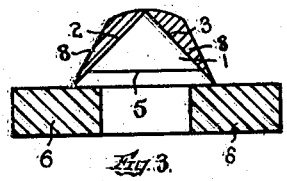
Figure 4:
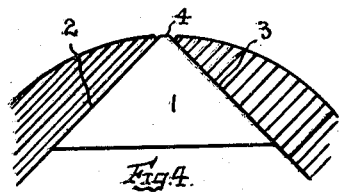
Figure 5:
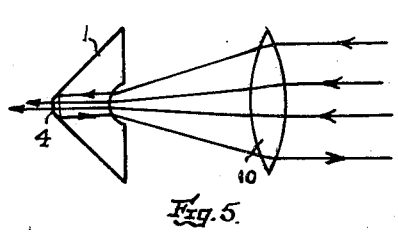
Figure 6:
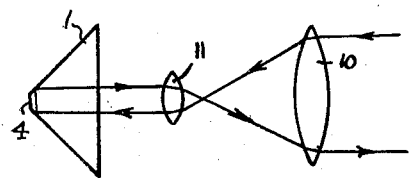

The invention may be carried into effect in a variety of ways, some of which will be described, by way of example, with reference to the accompanying drawings in which Figs. 1 and 2 show one arrangement in elevation and plan respectively, Fig. 3 is a section on the line $a$—$a$ of Fig. 2, Fig. 4 is an enlarged diagrammatic view of the slit aperture and Figs. 5 and 6 are diagrams illustrating the invention.

Referring to Figs. 1–3, a glass prism 1 having two surfaces 2 and 3 at right angles to one another is used. The line of intersection of these two surfaces is made very sharp and clean and the sharp edge is then ground away until the width of the 'flat' so formed is equal to the desired slit width (see 4 Fig. 4). If parallel light is transmitted through the base 5 of the prism, all the light falling upon the surfaces which are at right angles to one another and at 45° to the light beam will be totally reflected and only that portion of the light beam which impinges directly upon the 'flat' will be allowed to pass through the prism. The 'flat' accordingly acts as an optical slit.

The semi-angle of the prism, or the angle between the surfaces 2 and 3 of the prism and a perpendicular to the flat surface 4, may exceed 45° by $$45° - \sin^{-1}\frac{1}{\mu},$$

and can be less than 45° by $$\frac{1}{3}\left(45° - \sin^{-1}\frac{1}{\mu}\right).$$

If $\mu=1.6$, where $\mu$ is the index of refraction of the prism, the permissible latitude is from 43° to 51⅓°. For a right angle prism, light may be incident upon the prism surfaces between $$45° \pm \left(45° - \sin^{-1}\frac{1}{\mu}\right).$$

The mounting for the prism comprises a base piece 6 having secured thereon two members 7, which may be of hardened steel, having a space between them equal to the breadth of the prism. The contour of the member 7 can be seen from Fig. 1. Two cheek pieces 8 of hardened steel having a shape conforming to that of the members 7 are arranged upon the surfaces 2 and 3 of the prism. The prism and the cheek pieces may be held in position with suitable cement. The curved surface 9 of the members 7 and the cheek pieces 8 form a bearing surface for a photographic film. The 'flat' 4 is preferably made slightly convex to conform to the contour of the cheek pieces.

In a modification of the above arrangement, before the 'flat' is formed, the two surfaces 2 and 3 of the prism are silvered. On grinding the 'flat' 4 the silvering is removed over the width of the 'flat'. In this case it is not always necessary to utilize the property of total internal reflection since an actual slit with opaque borders is provided and the angle between the inclined surfaces may accordingly be outside the limits above mentioned.

In combination with either of the arrangements described, the base of the prism may be formed into or may have attached thereto a lens adapted to bring incident light to a focus at the slit. For this purpose, the base of the prism may be given a part cylindrical or a part spherical shape.

Two optical systems which may be used with the slit device are shown in Figs. 5 and 6. In Fig. 5, the base of the prism 1 is concave and acts as a lens. By the use of a convex lens 10, the light from a suitable source may be concentrated in a narrow parallel beam upon the 'flat' 4.

In the arrangement of Fig. 6, the base of the prism 1 is left flat and an additional convex lens 11 is used.

We claim:

1. An optical slit device comprising a prism having a flat surface formed on one edge thereof, the faces of said prism that terminate in said flat edge surface being angularly related to a perpendicular to said flat surface so that substantially all light not falling directly upon said flat surface is totally reflected internally of said prism.

2. An optical slit device comprising a prism having a flat surface formed on one edge thereof, the faces of said prism that terminate in said flat surface being at an angle of substantially 45° to a perpendicular to said flat surface.

3. An optical slit device comprising a prism having a flat surface formed on one edge thereof, the faces of said prism that terminate in said flat edge surface being angularly related to a perpendicular to said flat surface so that substantially all light not falling directly on said flat surface is totally reflected internally of said prism and said faces being silvered.

4. An optical slit device comprising a prism having a flat surface formed on one edge thereof, the faces of said prism that terminate in said flat surface being at an angle of substantially 45° with a perpendicular to said flat surface and said side surfaces being silvered.

5. An optical slit device comprising a prism having a surface constituting an aperture formed on one edge thereof, supporting means engaging the faces of said prism that terminate in said aperture-forming surface, said supporting means being convex and said aperture-forming surface being slightly convex and forming with said supporting means a smooth convex surface.

6. An optical slit device comprising a prism having a flat surface formed on one edge thereof, the faces of said prism that terminate in said flat edge surface forming an angle with each other of substantially 90°.

7. An optical slit device comprising a prism having a flat surface on one edge thereof, the faces of said prism that terminate in said flat surface forming such an angle with each other that the semi-angle of the prism must exceed 45° by more than $$45° - \sin^{-1}\frac{1}{\mu},$$

where $\mu$ is the index of refraction of the prism, to produce total internal reflection of light rays transmitted through said prism and impinging upon said faces.

8. An optical slit device comprising a prism having a flat surface on one edge thereof, the faces of said prism that terminate in said flat surface forming such an angle with each other that the semi-angle of the prism must be less than 45° by more than $$\frac{1}{3}\left(45° - \sin^{-1}\frac{1}{\mu}\right),$$

where $\mu$ is the index of refraction of the prism, to produce total internal reflection of light rays transmitted through said prism and impinging upon said faces.

9. An optical slit device comprising a prism having a flat surface on one edge thereof, the faces of said prism that terminate in said flat surface forming such an angle with each other that the semi-angle of the prism must exceed 45° by more than $$45° - \sin^{-1}\frac{1}{\mu},$$

and must be less than 45° by more than $$\frac{1}{3}\left(45° - \sin^{-1}\frac{1}{\mu}\right),$$

where $\mu$ is the index of refraction of the prism, to produce total internal reflection of light rays transmitted through said prism and impinging upon said faces.

In testimony whereof, we have signed our names to this specification at London, this 11th day of January, 1929, and at Camden, N. J., this 25th day of January, 1929.

CECIL OSWALD BROWNE.
ALFRED WHITAKER.